US008637816B1

(12) United States Patent
Mordehai et al.

(10) Patent No.: US 8,637,816 B1
(45) Date of Patent: Jan. 28, 2014

(54) SYSTEMS AND METHODS FOR MS-MS-ANALYSIS

(71) Applicant: Agilent Technologies, Inc., Loveland, CO (US)

(72) Inventors: Alexander Mordehai, Loveland, CO (US); Kenneth R. Newton, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/827,685

(22) Filed: Mar. 14, 2013

Related U.S. Application Data

(60) Provisional application No. 61/677,945, filed on Jul. 31, 2012.

(51) Int. Cl.

*H01J 3/00* (2006.01)
*H01J 49/42* (2006.01)
*H01J 49/26* (2006.01)
*B01D 59/44* (2006.01)

(52) U.S. Cl.

USPC ........... 250/292; 250/290; 250/282; 250/281; 250/286

(58) Field of Classification Search

USPC .......................... 250/292, 290, 282, 281, 286
See application file for complete search history.

(56) References Cited

U.S. PATENT DOCUMENTS

| | | | | |
|---|---|---|---|---|
| 5,714,755 | A | 2/1998 | Wells et al. | |
| 6,107,628 | A | 8/2000 | Smith et al. | |
| 6,583,408 | B2 | 6/2003 | Smith et al. | |
| 7,064,322 | B2 | 6/2006 | Crawford et al. | |
| 7,323,683 | B2 | 1/2008 | Krutchinsky et al. | |
| 7,329,866 | B2 * | 2/2008 | Wang | 250/290 |
| 7,372,024 | B2 * | 5/2008 | Mordehai et al. | 250/292 |
| 7,495,212 | B2 | 2/2009 | Kim et al. | |
| 7,692,143 | B2 * | 4/2010 | Guna | 250/292 |
| 7,851,752 | B2 | 12/2010 | Kim et al. | |
| 7,888,635 | B2 | 2/2011 | Belov et al. | |

OTHER PUBLICATIONS

Sunnie Myung et al.; High-capacity ion trap coupled to a time-of-flight mass spectrometer for comprehensive linked scans with no scanning losses; International Journal of Mass Spectrometry 301; 2011; pp. 211-219.

* cited by examiner

*Primary Examiner* — Nikita Wells

(57) ABSTRACT

A mass spectrum is acquired by accumulating parent ions in an ion trap, ejecting parent ions of a selected m/z ratio into a collision cell, producing fragment ions from the parent ions, and analyzing the fragment ions in a mass analyzer. The other parent ions remain stored in the ion trap, and thus the process may be repeated by mass-selectively scanning parent ions from the ion trap. In this manner, the full mass range of parent ions or any desired subset of the full mass range may be analyzed without significant ion loss or undue time expenditure. The collision cell may provide a large ion acceptance aperture and relatively smaller ion emission aperture. The collision cell may pulse ions out to the mass analyzer. The mass analyzer may be a time-of-flight analyzer. The timing of pulsing of ions out from the collision cell may be matched with the timing of pulsing of ions into the time-of-flight analyzer.

20 Claims, 12 Drawing Sheets

SYSTEMS AND METHODS FOR MS-MS-ANALYSIS

RELATED APPLICATIONS

This application claims the benefit of U.S. Provisional Patent Application Ser. No. 61/677,945, filed Jul. 31, 2012, titled "SYSTEMS AND METHODS FOR MS-MS ANALYSIS," the content of which is incorporated by reference herein in its entirety.

TECHNICAL FIELD

The present invention relates to acquisition of spectrometric data by tandem mass spectrometry (MS) or MS-MS.

BACKGROUND

A mass spectrometry (MS) system in general includes an ion source for ionizing components of a sample of interest, a mass analyzer for separating the ions based on their differing mass-to-charge ratios (or m/z ratios, or more simply "masses"), a ion detector for counting the separated ions, and electronics for processing output signals from the ion detector as needed to produce a user-interpretable mass spectrum. Typically, the mass spectrum is a series of peaks indicative of the relative abundances of detected ions as a function of their m/z ratios. To elucidate additional information regarding a sample, the MS system may be configured for carrying out tandem MS, or MS-MS, experiments. In this case, selected ions produced by the ion source, or "parent" ions, are dissociated into fragment ions (or "daughter" ions) in a collision cell. A mixture of the parent ions and fragment ions may then be transferred into the mass analyzer, and the resulting mass spectrum thus includes the fragment spectra.

Tandem MS may be implemented in a triple quadrupole (or QQQ) MS system, which includes three quadrupole devices in series. The first quadrupole is utilized for mass selection, the second quadrupole is an RF-only device enclosed in a gas chamber and utilized as the collision cell, and the third quadrupole is utilized as the mass analyzer. Tandem MS may also be implemented in a quadrupole time-of-flight (or qTOF) MS system, the main difference being that the mass analyzer is a TOF analyzer instead of a quadrupole device. In either system, the first quadrupole is operated as a mass filter and thus is capable of passing only a single parent ion at a time. All other ions are lost, eliminating the opportunity to use these ions to contribute to signal intensity. The sample introduced to the ion source may, however, yield hundreds to thousands of different parent ions (parent ions having differing m/z ratios), and each parent ion in turn may yield tens of different fragment ions in the collision cell. In the QQQ or qTOF system, obtaining fragment spectra from several parent ions requires repeating the ion selection, fragmentation and analysis sequence for each parent ion several times. The number of experimental repetitions needed or desired may not, however, be compatible with the time constraints imposed on the MS system. This is particularly the case when the MS system is employed to analyze sample components eluting from the column of a liquid chromatograph (LC) or gas chromatograph (GC). On the other hand, simply loading parent ions having a range of m/z ratios into a collision cell simultaneously is typically not an acceptable solution, as this approach typically does not enable the identification of which parent ion created which fragment ion.

Therefore, there is a need for MS-MS systems and methods that enable the collection and mass spectral analysis of all combinations of parent ions (or any desired subset of parent ions) and fragment ions from a sample of interest. There is also a need for MS-MS systems and methods capable of performing such ion collection and analysis within the time constraints imposed by any sample introduction process that may be done at the front end such as, for example, LC or GC elution.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a method for acquiring a mass spectrum includes accumulating a plurality of parent ions having a range of m/z ratios in an ion scanning trap; ejecting parent ions of a selected first m/z ratio from the ion scanning trap into a collision cell, wherein other parent ions of different m/z ratios remain stored in the ion scanning trap during ejection of the selected parent ions; producing fragment ions from at least some of the selected parent ions in the collision cell; confining the selected parent ions and the fragment ions to an ion confinement region that converges from an ion acceptance aperture to an ion emission aperture of the collision cell, wherein the ion emission aperture is smaller than the ion acceptance aperture; transmitting the fragment ions from the cell exit into a mass analyzer to acquire spectral data; and repeating the foregoing steps one or more times for other parent ions accumulated in the ion scanning trap having one or more selected m/z ratios different from the first m/z ratio, wherein a plurality of fragment ion spectra are acquired from a corresponding plurality of parent ions of different respective m/z ratios.

According to another embodiment, the parent ions are transmitted into the ion scanning trap along a trap axis, ejecting the selected parent ions from the ion scanning trap includes ejecting the selected parent ions through an aperture of an electrode of the ion scanning trap in a direction either in-line with or transverse to the trap axis.

According to another embodiment, the ion scanning trap includes a two-dimensional arrangement of electrodes coaxially disposed about a trap axis and axially disposed between a trap entrance and a trap exit in-line with an entrance of the collision cell, and ejecting the selected parent ions from the ion scanning trap includes ejecting the selected parent ions through the trap exit.

According to another embodiment, a mass spectrometry system includes an ion scanning trap comprising a plurality of trap electrodes surrounding an ion trapping region and configured for generating a radio frequency (RF) ion trapping field in the ion trapping region, and a trap exit communicating with the ion trapping region; a device for applying an RF trapping voltage to the trap electrodes; a device for scanning ions from the ion trapping region and through the trap exit on a mass-selective basis; a collision cell comprising a cell entrance communicating with the trap exit, a cell exit, and a plurality of cell electrodes arranged around a cell axis and between the cell entrance and the cell exit, wherein the cell electrodes surround an ion confining region and are configured for generating an RF ion confining field in the ion confining region such that the ion confining region converges in cross-section in a direction from the cell entrance to the cell exit; a device for applying an RF confining voltage to the cell electrodes; and a mass analyzer communicating with the cell exit.

According to another embodiment, the plurality of trap electrodes includes a pair of end cap electrodes spaced from each other along a trap axis, and a ring electrode coaxially disposed about the trap axis between the end cap electrodes.

According to another embodiment, the plurality of trap electrodes are elongated in parallel with a trap axis and disposed at a radial distance from the trap axis. In some embodiments, the trap exit is located at an axial end of the trap electrodes, and the device for scanning ions is configured for ejecting ions through the trap exit along the trap axis. In other embodiments, the trap exit is an aperture through one of the trap electrodes, and the device for scanning ions is configured for ejecting ions through the trap exit along a radial direction relative to the trap axis.

According to another embodiment, the device for scanning ions is configured for scanning a magnitude or a frequency of the RF trapping voltage.

According to another embodiment, the device for scanning ions is configured for applying an AC supplemental voltage between at least two of the trapping electrodes, and for scanning one or more of the following parameters: a magnitude of the RF trapping voltage, a frequency of the RF trapping voltage, a magnitude of the AC supplemental voltage, and a frequency of the AC supplemental voltage.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

The present disclosure describes methods, apparatus and systems for acquiring spectrometric data from analyte ions by way of tandem mass spectrometry (MS) or MS-MS. The methods, apparatus and systems enable the collection and mass spectral analysis of all combinations of parent ions (or any desired subset of parent ions) and fragment ions from a sample of interest. Moreover, ion collection and analysis may be performed within the time constraints imposed by any sample introduction process typically done at the front end such as, for example, chromatographic elution. The methods, apparatus and systems may accomplish this without any significant loss of ions, instrumental sensitivity and dynamic range, and may improve upon these figures of merit. Examples of embodiments are described below in conjunction with FIGS. 1-8.

Figure 1:
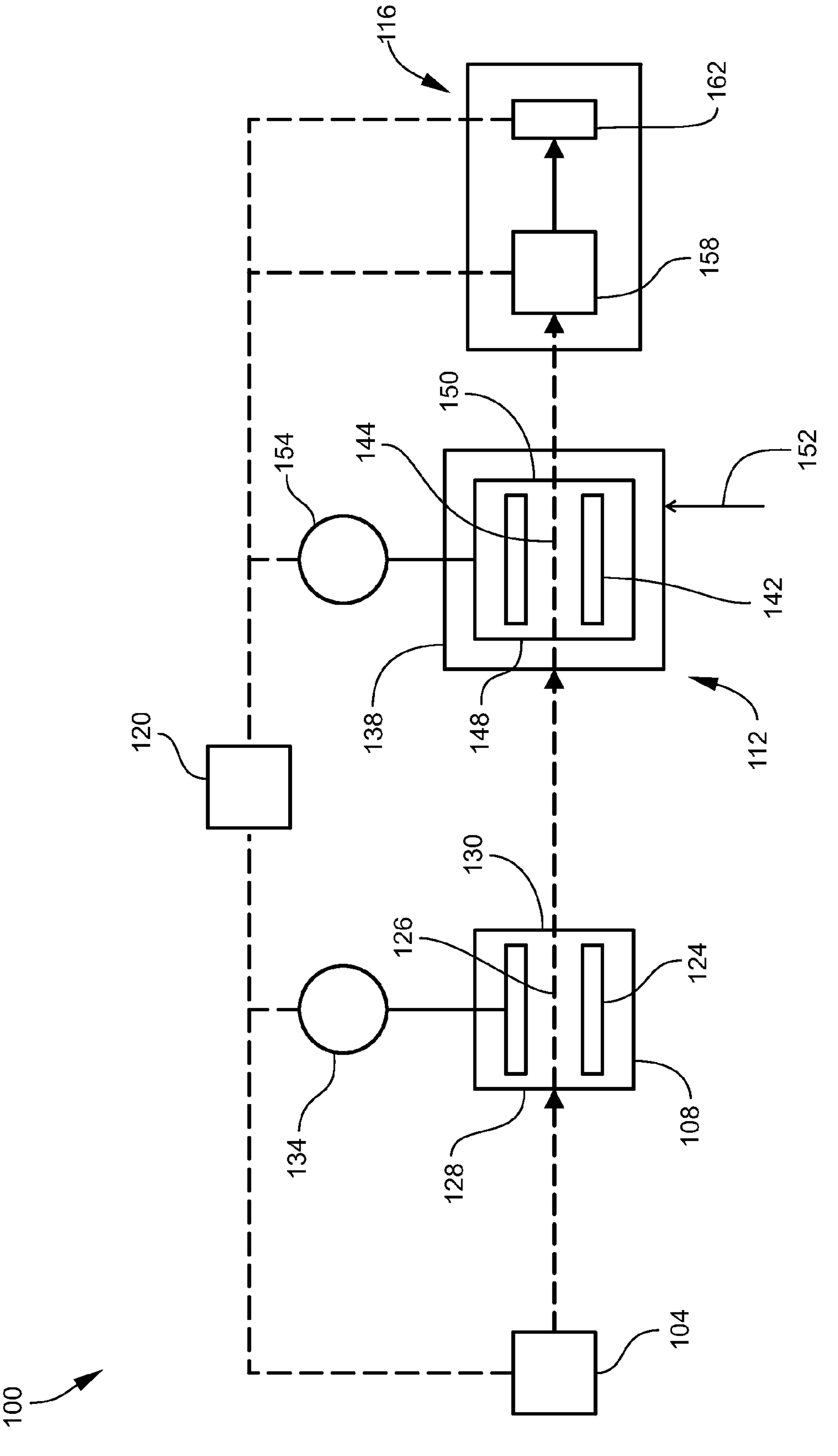
FIG. 1 is a schematic view of an example of a mass spectrometry (MS) system according to one embodiment.

FIG. 1 is a schematic view of an example of a mass spectrometry (MS) system 100 according to one embodiment. The MS system 100 generally includes an ion source 104, an ion scanning trap 108, a collision cell 112, a mass spectrometer 116, and a system controller 120.

The ion source 104 may be any type of continuous-beam or pulsed ion source suitable for tandem MS operations. Examples of ion sources 104 include, but are not limited to, electrospray ionization (ESI) sources, other atmospheric pressure ionization (API) sources, photo-ionization (PI) sources, electron ionization (EI) sources, chemical ionization (CI) sources, laser desorption ionization (LDI) sources, and matrix-assisted laser desorption ionization (MALDI) sources. Depending on the type of ionization implemented, the ion source 104 may reside in a vacuum chamber or may operate at or near atmospheric pressure. Sample material to be analyzed may be introduced to the ion source 104 by any suitable means, including hyphenated techniques in which the sample material is the output of an analytical separation instrument such as, for example, a gas chromatography (GC) or liquid chromatography (LC) instrument (not shown).

The ion scanning trap 108 generally includes a plurality of trap electrodes 124 arranged about a trap axis 126 and surrounding an interior region of the ion scanning trap 108, a trap entrance (or ion entrance) 128 into the interior region, and a trap exit (or ion exit) 130 out from the interior region. The ion scanning trap 108 is enclosed in a vacuum chamber (not shown). The trap electrodes 124 are in signal communication with an appropriate voltage source 134, which includes a radio frequency (RF) voltage source and typically also a direct current (DC) voltage source. In response to applying an RF voltage of appropriate parameters (RF drive frequency and magnitude), and typically also a DC voltage of appropriate magnitude superposed on the RF voltage, the trap electrodes 124 are configured to generate an RF quadrupole trapping field that confines ions of a desired mass range (m/z range) to the interior region for a desired period of time. The trap electrodes 124 are also configured to scan the trapped ions such that they are ejected from the ion scanning trap 108 on a mass-selective basis. Scanning may be done by scanning (varying) at least one of the trapping voltage parameters. In some embodiments scanning is done by resonant excitation, in which a relatively weak supplementary alternating current (AC) voltage of a certain frequency is applied between two opposing trap electrodes 124. At least one trapping voltage parameter is then scanned until the secular frequency of an ion of selected mass comes into resonance with a frequency that is directly or parametrically driven by the supplemental wave frequency. In this way, the selected ion can gain sufficient energy to overcome the repulsive force imparted by the RF trapping field and exit through the trap exit 130. Scanning may also be done by triple resonant ejection by adding a dipole component to the trapping field and a quadrupole and/or dipole component to the excitation field, as described for example in U.S. Pat. Nos. 5,714,755 and 7,034,293, the entire contents of which are incorporated herein by reference. As appreciated by persons skilled in the art, other ion ejection techniques may alternatively be implemented, such as mass-selective instability as described for example in U.S. Pat. No. 4,540,884, the entire contents of which are incorporated herein by reference.

In some embodiments, the trap electrodes 124 are arranged in a two-dimensional (2D) configuration (or linear configuration). As an example of a 2D ion trap, the trap electrodes 124 may include a multipole arrangement of four or more electrodes (generally, 2N electrodes where N is an integer equal to 2 or greater) that are parallel to the trap axis 126, elongated in the direction of the trap axis 126, positioned at a radial (transverse) distance from the trap axis 126, and circumferentially spaced from each other about the trap axis 126. The trap electrodes 124 may be cylindrical rods, or may present hyperbolic surfaces having foci that face the interior region, or in some cases may be plates. The RF trapping field is typically generated by applying an RF voltage to one pair of opposing trap electrodes 124, and an RF voltage 180 degrees out of phase with the first RF voltage to at least one other pair of opposing trap electrodes 124. For clarity only two trap electrodes 124 are shown in FIG. 1, with the understanding that two or more pairs of opposing trap electrodes 124 may be provided. The trap entrance 128 typically corresponds to the "upstream" axial end of the trap electrodes 124, and leads to the axially elongated interior region.

Ions are confined to an elongated ion-occupied volume, or ion cloud, along the trap axis by the RF trapping field, which in this case is a 2D trapping field that limits ion excursion in radial directions. The ion cloud may be further reduced by introducing an inert damping gas (e.g., helium, nitrogen, argon, etc.) into the interior region. DC voltages may be applied to ion optics (not shown) at the axial ends of the 2D ion trap to prevent ions from escaping through the axial ends. The 2D ion trap may be configured for radial ejection in which case the trap exit 130 is typically an aperture (or slot) formed through one of the trap electrodes 124. Alternatively, if the 2D ion trap is configured for axial ejection of ions, the trap exit 130 may correspond to the axial end opposite to the trap entrance 128, as schematically depicted in FIG. 1. Axial ion ejection is described, for example, in U.S. Pat. No. 6,177,668, the entire contents of which are incorporated herein by reference.

In other embodiments, the trap electrodes may be arranged in a three-dimensional (3D) configuration (not specifically shown). As an example of a 3D ion trap, the trap electrodes may include a pair of hyperbolic end-cap electrodes spaced apart from each other along the trap axis 126, and a hyperbolic ring electrode positioned between the end-cap electrodes and coaxially swept about the trap axis 126. The respective foci of the end-cap electrodes face each other and thus face the interior region of the 3D ion trap, and the focus of the ring electrode also faces the interior region. Application of the RF trapping voltage thus generates a 3D trapping field that constrains the motion of ions to an ion cloud in the center of the interior region, which may be further reduced by a damping gas. The trap entrance 128 and trap exit 130 may be one or more apertures typically formed through the end-cap electrodes. Examples of the structure and operation of 3D as well as 2D ion traps are described, for example, in above-referenced U.S. Pat. No. 7,034,293.

The collision cell 112 generally includes an ion guide enclosed in a collision gas chamber 138. The ion guide includes a plurality of cell electrodes 142 arranged about a cell axis 144 and surrounding an interior region of the ion guide, a cell entrance (or ion entrance) 148 into the interior region, and a cell exit (or ion exit) 150 out from the interior region. A gas inlet 152 admits a neutral collision gas (e.g., helium, nitrogen, argon, etc.) into the collision gas chamber 138 to enable ion fragmentation by collision-induced dissociation (CID). A voltage source 154 applies an RF voltage or composite of RF/DC voltage to the cell electrodes 142 to confine parent ions along the cell axis 144. DC voltages are also utilized to accelerate the ions from the cell entrance 148 and cell exit 150, during which time parent ions collide with the collision gas to produce fragment ions as appreciated by persons skilled in the art. The collision cell 112 may be configured to output fragment ions, or a mixture of fragment ions and non-fragmented parent ions. Some specific examples of embodiments of the collision cell 112 are described below in conjunction with FIGS. 2-7.

The mass spectrometer 116 generally includes a mass analyzer 158 and an ion detector 162 enclosed in a vacuum chamber. The mass analyzer 158 may have a design suitable for collecting a full mass range of fragment ions (or fragment and parent ions) from the collision cell 112 with high efficiency and minimal loss, and mass-selectively sorting the ions with high resolution in accordance with the present teachings. Accordingly, a time-of-flight (TOF) analyzer is presently considered to be an example of a suitable mass analyzer 158. The ion detector 162 receives the ions and produces ion detection signals from which a mass spectrum of the detected fragment ions (or fragment and parent ions) may be generated, as appreciated by persons skilled in the art.

The system controller 120 is schematically depicted as representing one or more modules configured for controlling, monitoring and/or timing various functional aspects of the MS system 100 such as, for example, controlling the operation of the ion source 104; controlling the application of voltages to the ion scanning trap 108 and setting and adjusting the voltage parameters for loading, storing and scanning out parent ions; controlling the application of voltages to the collision cell 112 and setting and adjusting the voltage parameters for collecting parent ions, adjusting ion energies, accelerating ions toward the cell exit, ejecting ions in either a continuous or pulsed manner, and adjusting collision gas flow and/or pressure; controlling any ion optics (not shown) provided between the illustrated components; and controlling vacuum pumps. The system controller 120 may also be configured for receiving the ion detection signals from the ion detector 162 and performing other tasks relating to data acquisition and signal analysis as necessary to generate a mass spectrum characterizing the sample under analysis. The system controller 120 may include a computer-readable medium that includes instructions for performing any of the methods disclosed herein. For all such purposes, the system controller 120 is schematically illustrated as being in signal communication with various components of the MS system 100 via wired or wireless communication links represented by dashed lines. Also for these purposes, the system controller 120 may include one or more types of hardware, firmware and/or software, as well as one or more memories and databases. The system controller 120 typically includes a main electronic processor providing overall control, and may include one or more electronic processors configured for dedicated control operations or specific signal processing tasks. The system controller 120 may also schematically represent all voltage sources not specifically shown, as well as timing controllers, clocks, frequency/waveform generators and the like as needed for applying voltages to various components of the MS system 100. The system controller 120 may also be representative of one or more types of user interface devices, such as user input devices (e.g., keypad, touch screen, mouse, and the like), user output devices (e.g., display screen, printer, visual indicators or alerts, audible indicators or alerts, and the like), a graphical user interface (GUI) controlled by software, and devices for loading media readable by the electronic processor (e.g., logic instructions embodied in software, data, and the like). The system controller 120 may include an operating system (e.g., Microsoft Windows® software) for controlling and managing various functions of the system controller 120.

It will be understood that FIG. 1 is a high-level schematic depiction of the MS system 100 disclosed herein. Other components, such as additional structures, ion optics, ion guides and electronics may be included needed for practical implementations.

An example of a method for acquiring a mass spectrum from a sample of interest will now be described with reference to FIG. 1. The sample is introduced in the ion source 104 and the ion source 104 produces a plurality of parent ions having m/z ratios spanning some initial mass range. The parent ions are transmitted into and accumulated in the ion scanning trap 108. After accumulation, the ion scanning trap 108 ejects parent ions of a selected first m/z ratio (or "first parent ions"), and the first parent ions are transmitted into and through the collision cell 112. While moving through the collision cell 112, at least some of the first parent ions undergo OD whereby fragment ions of a range of m/z ratios are produced. After dissociation, fragment ions and non-fragmented first parent ions may undergo collisional cooling (or thermalization) as they approach the cell exit 150. The fragment ions (and any non-fragmented first parent ions) are then transmitted into the mass spectrometer 116 and spectral data is generated.

While the first parent ions are transmitted through the collision cell 112 and the resulting fragment ions (and any non-fragmented first parent ions) are sorted in the mass spectrometer 116, the ion scanning trap 108 continues to store the other parent ions (having m/z ratios different from the first parent ions) from the initial mass range that was originally collected from the ion source 104. This is in contrast to a conventional MS-MS system in which the ion selection device is a quadrupole mass filter that transmits parent ions of a single m/z ratio and allows all other parent ions of different m/z ratios to be lost. Thus in the present method, while the first parent ions are being processed, the trapping parameters of the ion scanning trap 108 may be adjusted to scan out parent ions of a selected second m/z ratio (or "second parent ions"), which are then processed in the collision cell 112 to produce fragment ions. These fragment ions (and any non-fragmented second parent ions) are then processed in the mass spectrometer 116 to produce spectral data as described above. This process may be repeated for all other parent ions of desired m/z ratios that continue to be stored in the ion scanning trap 108. In this manner, a mass spectrum may be constructed from all combinations of parent ions (or any desired subset of parent ion m/z ratios) obtained from the sample of interest and from all fragment ions derived from each parent ion m/z ratio. Moreover, as described by way of examples below, the collision cell 112 may be configured to increase the efficiency of ion collection from the ion scanning trap 108 and transmission into the mass spectrometer 116, thereby reducing the loss of ions and increasing the sensitivity of the mass spectrometer 116.

Figure 2:
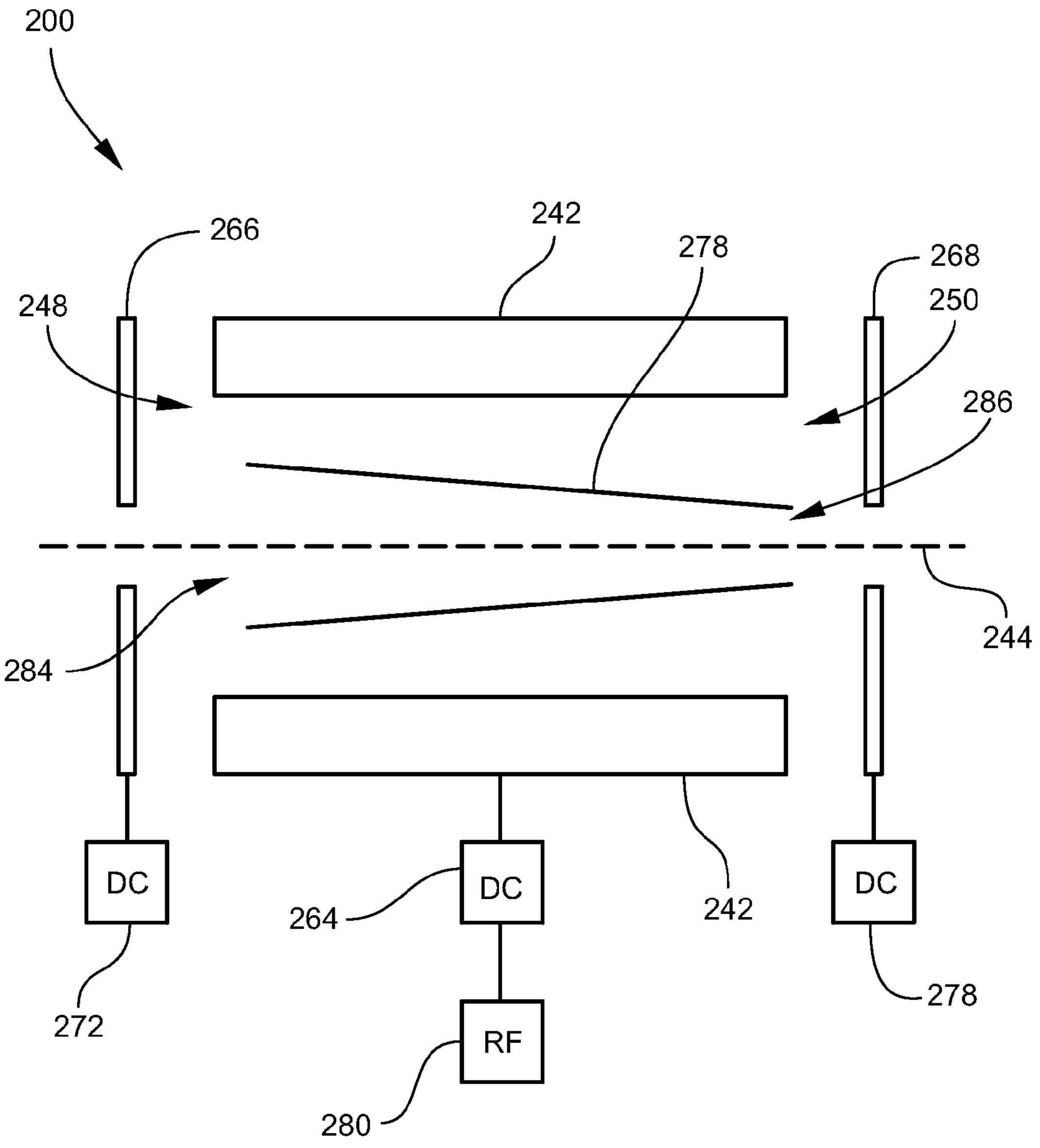
FIG. 2 is a schematic side view of an example of a collision cell according to one embodiment.

FIG. 2 is a schematic side view of an example of a collision cell 200 according to one embodiment. As noted above, the collision cell 200 includes a plurality of cell electrodes 242 enclosed in a collision gas chamber (not shown). For clarity, only two cell electrodes 242 are shown. The cell electrodes 242 are arranged about a cell axis 244 and surround an interior region of the collision cell 200. One axial end of the cell electrodes 242 corresponds to a cell entrance (or ion entrance) 248 into the interior region, and the other axial end corresponds to a cell exit (or ion exit) 250 out from the interior region. Ions are accelerated from the cell entrance 248 to the cell exit 250 in the presence of a collision gas by imparting a DC potential across the axial length of the cell electrodes 242. Depending on how the cell electrodes 242 are configured, the DC potential may be generated by applying a DC voltage to the cell electrodes 242 (as depicted by a DC voltage source 264), or to one or more entrance lenses 266 and exit lenses 268 at the cell entrance 248 and cell exit 250, respectively (as depicted by DC voltage sources 272 and 274). The cell electrodes 242, exit lens(es) 268, or both, may be configured for pulsing fragment ions (or a mixture of fragment ions and non-fragmented parent ions) out from the collision cell 200. The timing of this pulsing may be matched with the timing of ion injection into the mass analyzer 116 as described below.

The cell electrodes 242 may also be configured for generating an ion confining region (or ion beam) 278 that converges in the direction of the cell exit 250, in response to application of an RF voltage or RF/DC composite voltage (as depicted by an RF voltage source 280). Accordingly, the collision cell 200 may be described as defining an ion acceptance aperture 284 at the cell entrance 248 and an ion emittance aperture 286 at the cell exit 250, wherein the ion acceptance aperture 284 is greater in cross-sectional area than the ion emittance aperture 286. In this manner, the ion confining region 278 tapers (its cross-sectional area is reduced or compressed in the radial direction) along the length of the collision cell 200 toward the cell exit 250. This convergence is useful for matching the output geometry of the ion scanning trap 108 with the input geometry of the mass analyzer 116, increasing the efficiency of both ion collection from the ion scanning trap 108 and ion injection into the mass analyzer 116, and consequently increasing the sensitivity of the mass analyzer 116. In the case of a TOF analyzer, the convergence is also useful for reducing the spread of the radial velocity of the ions. Generally, the cross-sectional area of the ion acceptance aperture 284 should be large enough to maximize the efficiency of collection of ions from the ion scanning trap 108 (or from any intervening ion optics), particularly in cases where the ion beam from the ion scanning trap 108 is somewhat dispersed or divergent. The cross-sectional area of the ion emittance aperture 286 should be small enough to maximize the efficiency of transmission of ions into the mass analyzer 116 (or into any intervening ion optics), but without creating instability in ions of relatively low mass. In some embodiments, the cross-sectional area of the ion acceptance aperture 284 may range from about 0.7 $mm^2$ to about 600 $mm^2$, and the cross-sectional area of the ion emittance aperture 286 may range from about 0.03 $mm^2$ to about 0.5 $mm^2$. An arrangement of cell electrodes 242 configured for generating a converging ion confining region 278 may be referred to as an "ion funnel," examples of which are described below with reference to FIGS. 3-6.

Figure 3:
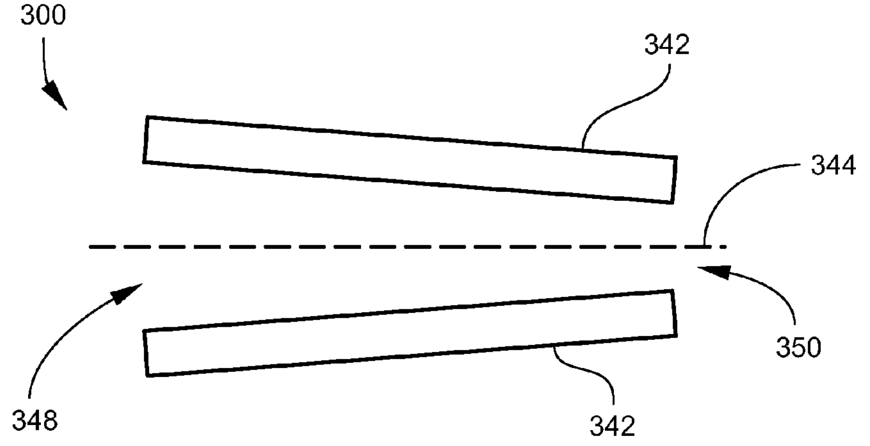
FIG. 3 is a schematic side view of an example of a collision cell according to another embodiment.
Figure 4:
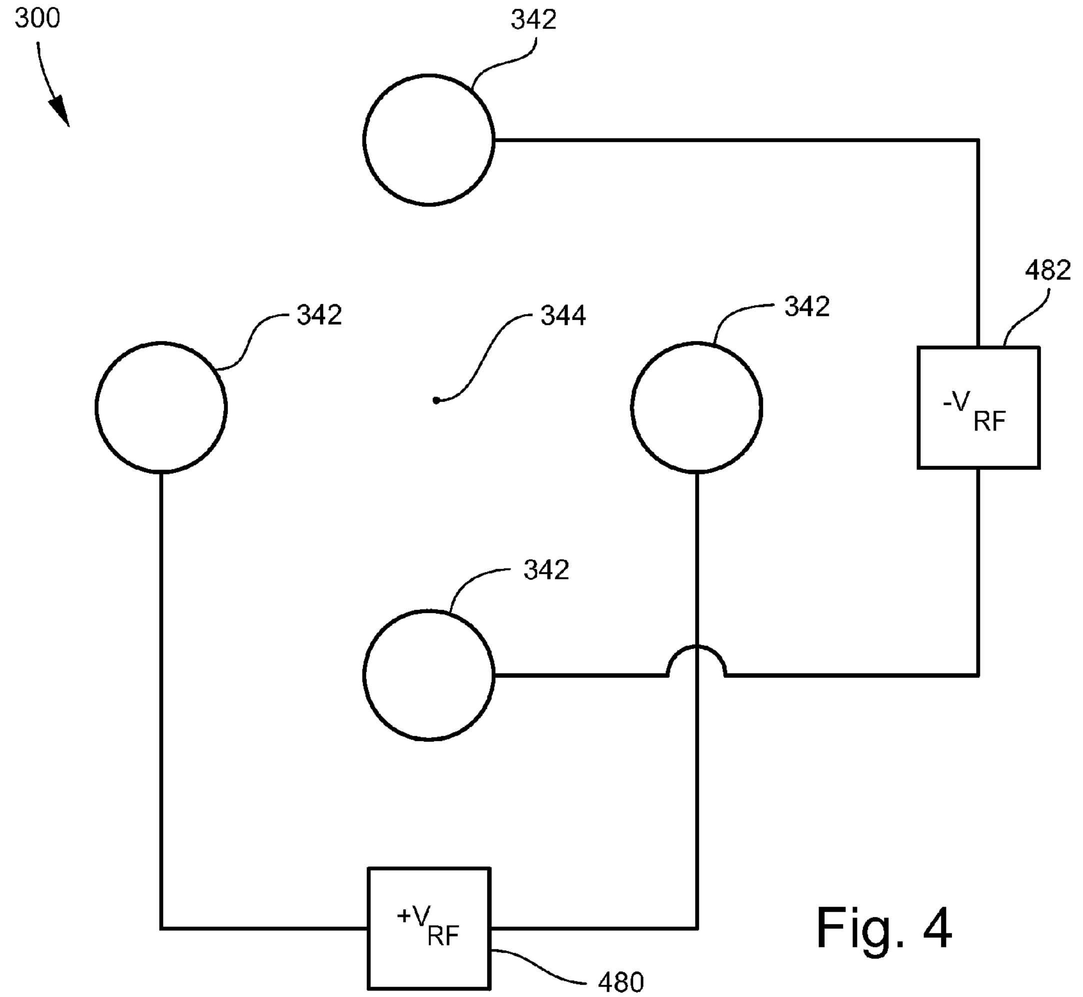
FIG. 4 is a schematic end view of the collision cell illustrated in FIG. 3.

FIG. 3 is a schematic side view of an example of a collision cell 300 according to another embodiment. FIG. 4 is a schematic end view of the collision cell 300. The collision cell 300 includes a plurality of cell electrodes 342 enclosed in a collision gas chamber (not shown). The cell electrodes 342 are arranged about a cell axis 344 and surround an interior region. One axial end of the cell electrodes 342 corresponds to a cell entrance 348 and the other axial end corresponds to a cell exit 350. The collision cell 300 may also include one or more axially positioned entrance and exit lenses (not shown) as noted above. In this embodiment, the cell electrodes 342 have a multipole configuration in which each cell electrode 342 is elongated generally in a direction from the cell entrance 348 to the cell exit 350. For clarity, only one opposing pair of cell electrodes 342 is shown in FIG. 3. By way of example, FIG. 4 illustrates a quadrupole arrangement in which two opposing pairs of cell electrodes 342 are provided. It will be understood, however, that more than two opposing pairs of cell electrodes 342 may be provided to realize a higher-order multipole arrangement. In typical implementations, the RF confining field is produced by applying RF voltages to each cell electrode 342 such that the RF voltage on any given cell electrode 342 is 180 degrees out of the phase with the RF voltage on the adjacent cell electrode(s) 342, as schematically depicted by RF voltage sources 480 and 482. DC voltages may be applied to some or all of the cell electrodes 342 and/or to entrance and exit lenses as needed to control the axial motion of the ions, including pulsing out to the mass analyzer 116 if desired. Also in this embodiment, the cell electrodes 342 are oriented so as to converge toward each other in the direction of the cell exit 350, i.e., at an angle to the cell axis 344, such that the cross-sectional area of the interior region at the cell entrance 348 is greater than the cross-sectional area at the cell exit 350. In some embodiments, the cell electrodes 342 may be oriented at an angle ranging from about 0.5 degrees to about 10 degrees relative to the cell axis 344. This electrode geometry generates a converging ion confining region as described above in conjunction with FIG. 2.

In another embodiment, the cell electrodes 342 may be generally parallel but their diameters are varied along the axial direction such that the cross-sectional area of the interior region at the cell entrance 348 is greater than the cross-sectional area at the cell exit 350, thereby providing a converging ion confining region as described above. In another embodiment, the cell electrodes 342 may be physically converging as shown in FIG. 3 and also have varying diameters.

Figure 5:
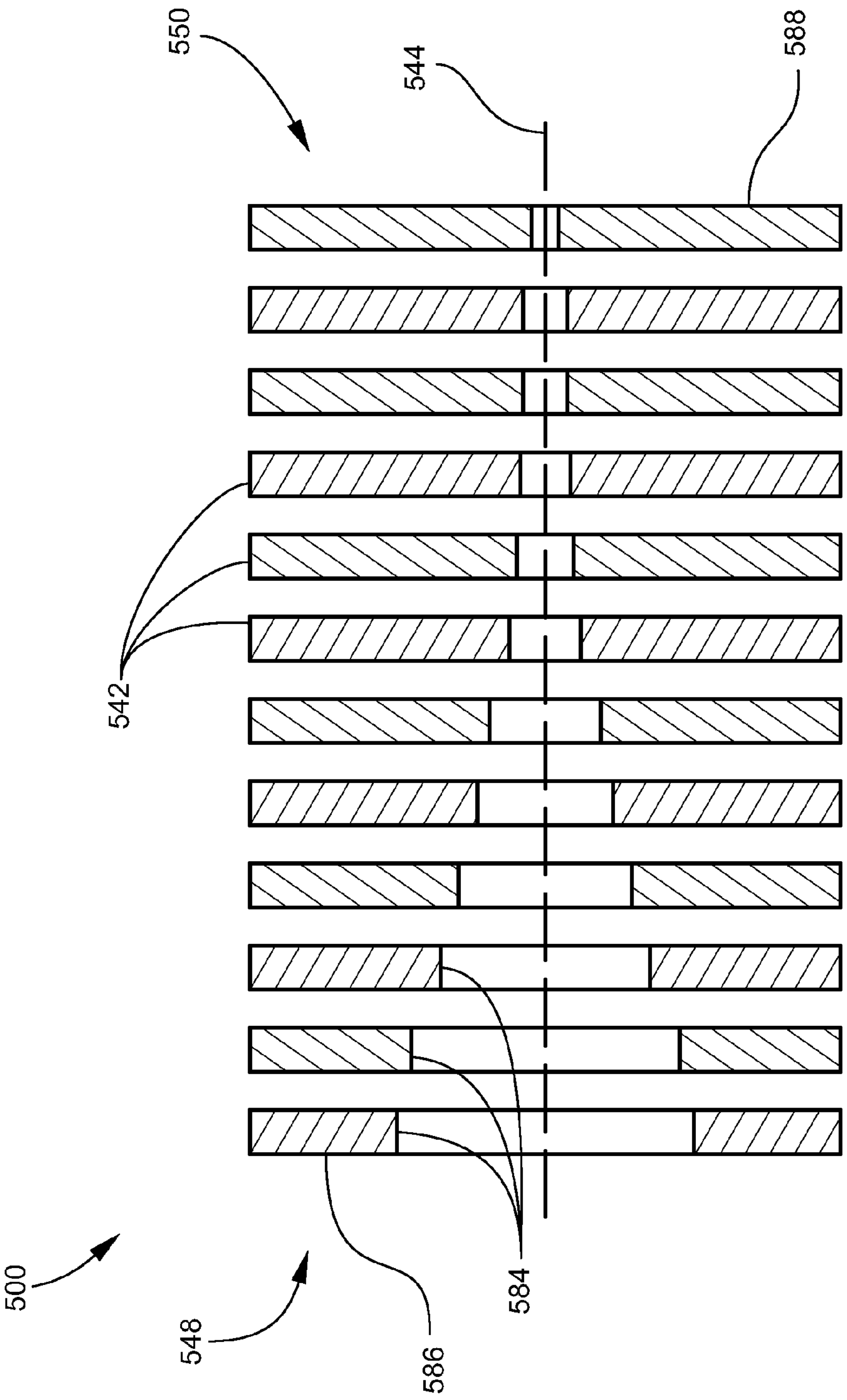
FIG. 5 is a schematic side view of an example of a collision cell according to another embodiment.

FIG. 5 is a schematic side view of an example of a collision cell 500 according to another embodiment. The collision cell 500 includes a plurality of cell electrodes 542 enclosed in a collision gas chamber (not shown). The cell electrodes 542 are arranged about a cell axis 544 and surround an interior region. One axial end of the cell electrodes 542 corresponds to a cell entrance 548 and the other axial end corresponds to a cell exit 550. The collision cell 500 may also include one or more axially positioned entrance and exit lenses (not shown) as noted above. In this embodiment, the cell electrodes 542 include a series of plate-shaped electrodes arranged transversely to the cell axis 544 and axially spaced from each other. Each cell electrode 542 has an aperture 584 that is typically centered on the cell axis 544. The aperture 584 of a first cell electrode 586 at the cell entrance 548 has the largest cross-sectional area, the aperture 584 of a last cell electrode 588 at the cell exit 550 has the smallest cross-sectional area, and the apertures 584 of the intermediate cell electrodes 542 have one or more intermediate cross-sectional areas. The electrode apertures 584 reduce in cross-sectional area (e.g., reduce in diameter in the case of circular apertures)—and thus the cross-sectional area of the interior region tapers—in the direction of the cell exit 550, resulting in an ion funnel configuration. The apertures 584 may be circular or elliptical, or alternatively may be polygonal (e.g., rectilinear), as desired for best accommodating the output geometry of the ion scanning trap 108 and/or the input geometry of the mass analyzer 116. For example, a rectilinear aperture may be found to be advantageous for efficiently receiving an ion beam from a rectilinear or slot-shaped trap exit 130, which is often provided in linear ion traps configured for radial ion ejection. In typical implementations, the RF confining field is produced by applying RF voltages to each cell electrode 542 such that the RF voltage on any given cell electrode 542 is 180 degrees out of the phase with the RF voltage on the adjacent cell electrode(s) 542. DC voltages may be applied to the first cell electrode 586, last cell electrode 588, and one or more of the intermediate cell electrodes 542 as needed to control the axial motion of the ions, including pulsing out to the mass analyzer 116 if desired. This electrode geometry generates a converging ion confining region as described above in conjunction with FIG. 2.

Figure 6:
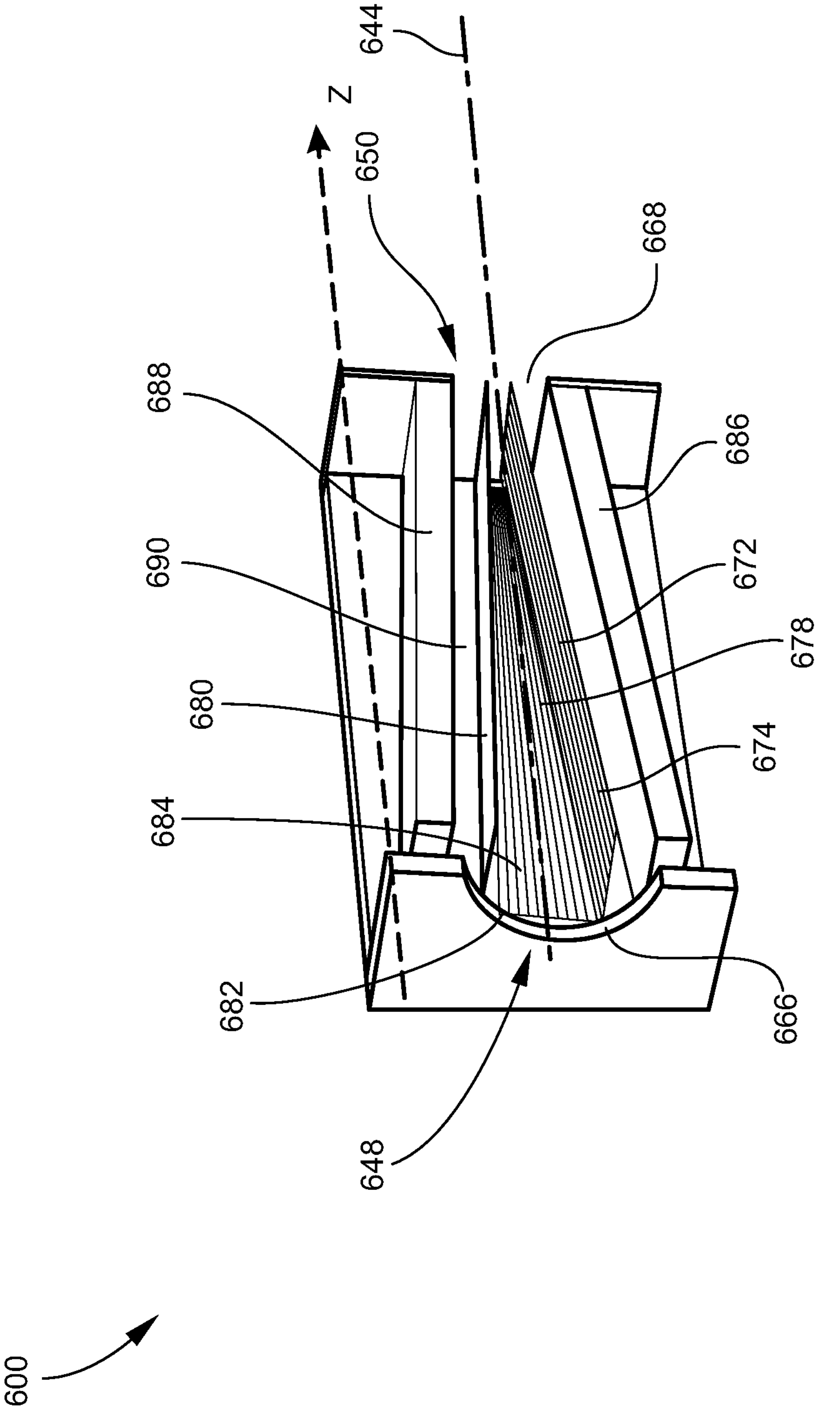
FIG. 6 is a cut-away perspective view of an example of a collision cell according to another embodiment.

FIG. 6 is a cut-away perspective view of an example of a collision cell 600 according to another embodiment. The collision cell 600 may be characterized as providing a longitudinal "RF carpet" arrangement with converging geometry. The collision cell 600 includes a plurality of cell electrodes enclosed in a collision gas chamber (not shown). The cell electrodes are arranged about a cell axis 644 and surround an interior region. One axial end of the cell electrodes corresponds to a cell entrance 648 and the other axial end corresponds to a cell exit 650. The collision cell 600 may also include one or more axially positioned entrance lenses 666 and exit lenses 668 as noted above. In this embodiment, the cell electrodes are elongated generally in a direction from the cell entrance 648 to the cell exit 650 and have a relatively small cross-sectional dimension (e.g., width in the case of a rectilinear cross-section, or diameter in the case of a circular cross-section). Additionally, the cell electrodes are disposed on (or formed on, or supported by) two or more substrates. Thus, in the illustrated example, the collision cell 600 includes a first substrate 672 on which a plurality of first cell electrodes 674 are disposed, and an opposing second substrate 680 on which a plurality of second cell electrodes (not shown) are disposed. The collision cell 600 may also include a third substrate 682 on which a plurality of third cell electrodes 684 are disposed, and an opposing fourth substrate (not shown) on which a plurality of fourth electrodes (not shown) are disposed. Alternatively, contiguous conductive layers may be substituted for one of the opposing sets of cell electrodes. The third substrate 682 and fourth substrate may be oriented in planes orthogonal to those of the first substrate 672 and second substrate 680. The first substrate 672 and second substrate 680 may be disposed on respective bases or walls 686 and 688, which in FIG. 6 are shown to be detached for illustrative purposes. The third substrate 682 may similarly be disposed on a base or wall 690, as well as the fourth substrate (not shown).

On any given substrate (e.g., 672, 680, 682), each cell electrode is parallel to the other cell electrodes. In typical implementations, the RF confining field is produced by applying RF voltages to each cell electrode such that the RF voltage on any given cell electrode is 180 degrees out of the phase with the RF voltage on the adjacent cell electrode(s) on the same substrate. In some embodiments, the RF voltage may be applied to only one pair of opposing electrode sets, such as only to the first cell electrodes 674 and second cell electrodes, or only to the third cell electrodes 684 and fourth cell electrodes. DC voltages may be applied to some or all of the cell electrodes and/or to entrance lenses 666 and exit lenses 668 as needed to control the axial motion of the ions, including pulsing out to the mass analyzer 116 if desired. In some embodiments, DC voltages may be applied to only one pair of opposing electrode sets or to one pair of opposing contiguous conductive layers. In the illustrated embodiment, the first substrate 672 and the second substrate 680 (and thus the first cell electrodes 674 and second cell electrodes) are oriented so as to converge in the direction of the cell exit 650, i.e., at an angle to the cell axis 644, such that the cross-sectional area of the interior region at the cell entrance 648 is greater than the cross-sectional area at the cell exit 650. In some embodiments, the cell electrodes may be oriented at an angle ranging from about 0.5 degrees to about 10 degrees relative to the cell axis 644. The third substrate 682 and the fourth substrate (and thus the third cell electrodes 684 and fourth cell electrodes) may likewise converge toward each other relative to the cell axis 644, or alternatively may be parallel to each other. In either case, the electrode geometry illustrated in FIG. 6 generates a converging ion confining region 678 as described above in conjunction with FIG. 2.

As one non-limiting example, the substrates of the collision cell 600 are composed of a suitable dielectric material and the cell electrodes are formed on the substrates by any suitable fabrication or microfabrication technique. Each cell electrode may have a cross-sectional dimension (e.g., width or diameter) ranging from about 5 μm to about 500 μm, a thickness (or height above the substrate) ranging from about 0.1 μm to about 50 μm, and a pitch (i.e., spacing between adjacent electrodes) ranging from about 10 μm to about 1000 μm.

More generally, the cell electrodes have relatively small dimensions as compared, for example, to conventional multipole arrangements of rod-type electrodes. As a result, the RF confining field is maintained in comparative close proximity to the cell electrodes and their respective substrates. This in turn results in the field-free or near field-free region through which the cell axis 644 passes being larger in comparison to that established by conventional electrode geometries. The resulting spatial form of the electric field may facilitate the generation of a converging ion confining region 678 that has a large ion acceptance aperture and a small ion emittance aperture. Moreover, this configuration may prevent the establishment of a reflective RF field at the cell exit 650 that might undesirably reflect ions back toward the cell entrance 648.

Figure 7:
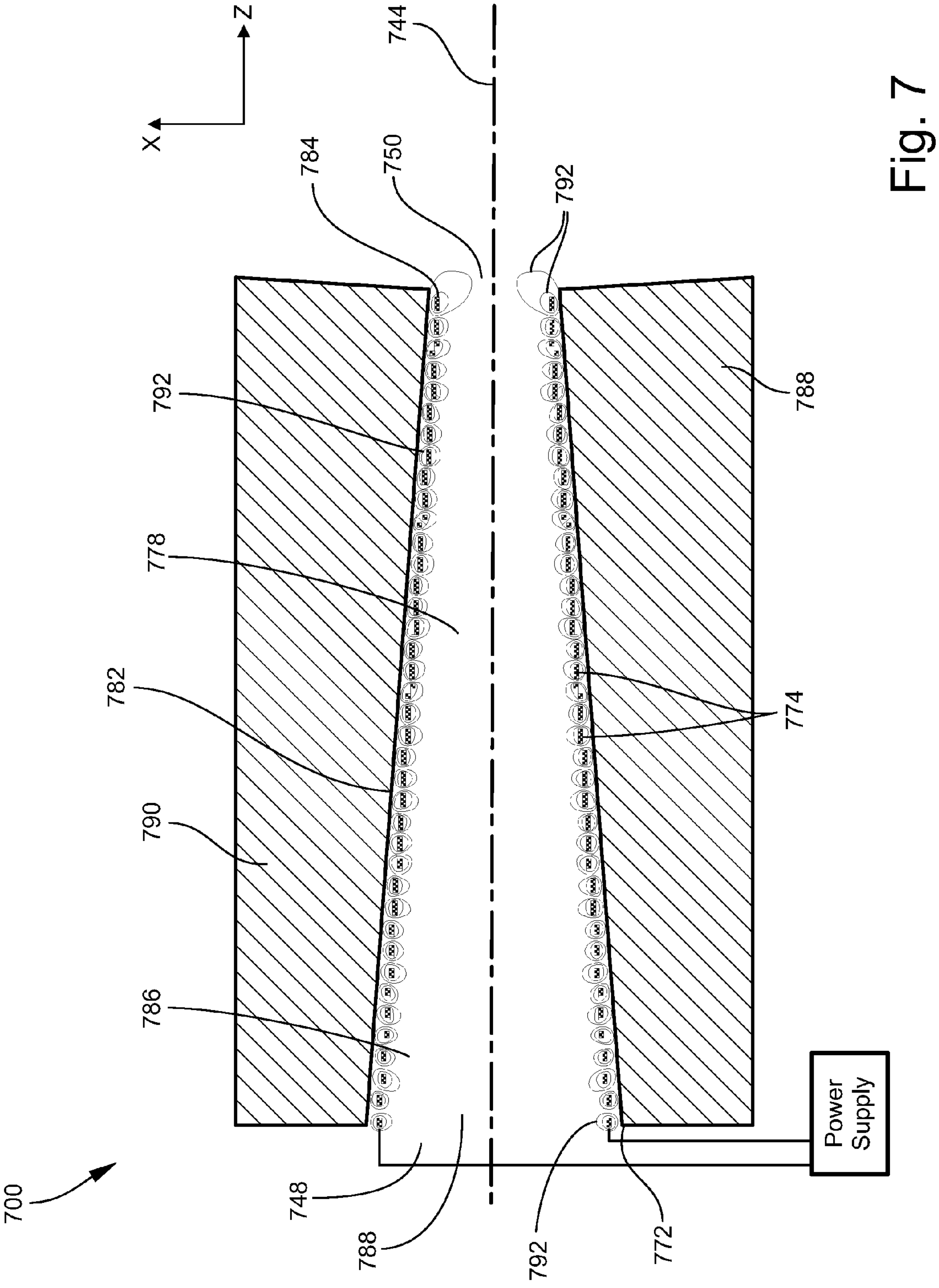
FIG. 7 is a cross-sectional side view of an example of a collision cell according to another embodiment.

FIG. 7 is a cross-sectional side view of an example of a collision cell 700 according to another embodiment. The collision cell 700 may be characterized as providing a transverse "RF carpet" arrangement with converging geometry. The collision cell 700 includes a plurality of cell electrodes enclosed in a collision gas chamber (not shown). The cell electrodes are arranged about a cell axis 744 and surround an interior region. One axial end of the cell electrodes corresponds to a cell entrance 748 and the other axial end corresponds to a cell exit 750. The collision cell 700 may also include one or more axially positioned entrance and exit lenses (not shown) as noted above. The cell electrodes have a relatively small cross-sectional dimension as in the case of the electrodes described above in conjunction with FIG. 6. In this embodiment, however, the cell electrodes are oriented in a direction orthogonal to those illustrated in FIG. 6, i.e., orthogonal to the X-Z plane depicted in FIG. 7. In the illustrated example, the collision cell 700 includes a first substrate 772 on which a plurality of first cell electrodes 774 are disposed, and an opposing second substrate 782 on which a plurality of second cell electrodes 784 are disposed. The collision cell 700 may also include a third substrate 786 on which a contiguous conductive layer 788 is disposed, and an opposing fourth substrate (not shown) on which a contiguous conductive layer (not shown) is disposed. Alternatively, a plurality of third cell electrodes (not shown) and a plurality of fourth electrodes (not shown) may be disposed on the third substrate 786 and fourth substrate, respectively. The third substrate 786 and fourth substrate may be oriented in planes orthogonal to those of the first substrate 772 and second substrate 782. The first substrate 772 and second substrate 782 may be disposed on respective bases or walls 788 and 790, as well as the third substrate 786 and fourth substrate (not shown).

On any given substrate (e.g., 772, 782, 786), each cell electrode is parallel to the other cell electrodes. In typical implementations, the RF confining field is produced by applying RF voltages to each cell electrode such that the RF voltage on any given cell electrode is 180 degrees out of the phase with the RF voltage on the adjacent cell electrode(s) on the same substrate. In some embodiments, the RF voltage may be applied to only one pair of opposing electrode sets, such as only to the first cell electrodes 774 and second cell electrodes 784, or only to the third cell electrodes and fourth cell electrodes (if provided). DC voltages may be applied to some or all of the cell electrodes and/or to entrance and exit lenses as needed to control the axial motion of the ions, including pulsing out to the mass analyzer 116 if desired. In some embodiments, DC voltages may be applied to only one pair of opposing electrode sets or to one pair of opposing contiguous conductive layers. In the illustrated embodiment, the first substrate 772 and the second substrate 782 (and thus the first cell electrodes 774 and second cell electrodes 784) are oriented so as to converge in the direction of the cell exit 750, i.e., at an angle to the cell axis 744, such that the cross-sectional area of the interior region at the cell entrance 748 is greater than the cross-sectional area at the cell exit 750. In some embodiments, the cell electrodes may be oriented at an angle ranging from about 0.5 degrees to about 10 degrees relative to the cell axis 744. The third substrate 786 and the fourth substrate (and thus any cell electrodes provided thereon) may likewise converge toward each other relative to the cell axis 744, or alternatively may be parallel to each other. In either case, the electrode geometry illustrated in FIG. 7 generates a converging ion confining region 778 as described above in conjunction with FIG. 2.

Similar to the embodiment illustrated in FIG. 6, the cell electrodes have relatively small dimensions, resulting in an RF confining field that is maintained in close proximity to the cell electrodes and their respective substrates. This configuration may have advantages as noted above. In FIG. 7, the RF confining field is depicted by equipotential lines 792 distributed around each cell electrode. Similarly distributed equipotential lines could be visualized around the cross-section of each cell electrode in the embodiment of FIG. 6.

In the examples illustrated in FIGS. 6 and 7, the ion acceptance aperture and the ion emittance aperture are each rectilinear in cross-section. In some embodiments, the ion acceptance aperture has a height ranging from about 1 mm to about 3 mm and a width ranging from about 7.5 mm to about 20 mm. In some embodiments, the ion emittance aperture has a height ranging from about 0.05 mm to about 1 mm and a width ranging from about 5 mm to about 15 mm.

In another embodiment (not shown), the cell electrodes of the collision cell may generally have a parallel, elongated multipole configuration as shown in FIG. 2. The converging ion confining region 278 may be generated by varying the RF confining field such that it has a predominant higher-order multipole field component (e.g., a hexapole component) at the cell entrance 248 and a predominant lower-order multipole field component (e.g., a quadrupole component) at the cell exit 250. This may be accomplished by applying appropriate RF voltages to the cell electrodes 242, which in some embodiments may be axially segmented to facilitate varying the RF confining field for this purpose. A fuller description of this approach and additional examples of electrode arrangements, albeit not in the context of a collision cell, are provided in U.S. Pat. No. 8,124,930 the entire contents of which are incorporated herein by reference.

Figure 8:
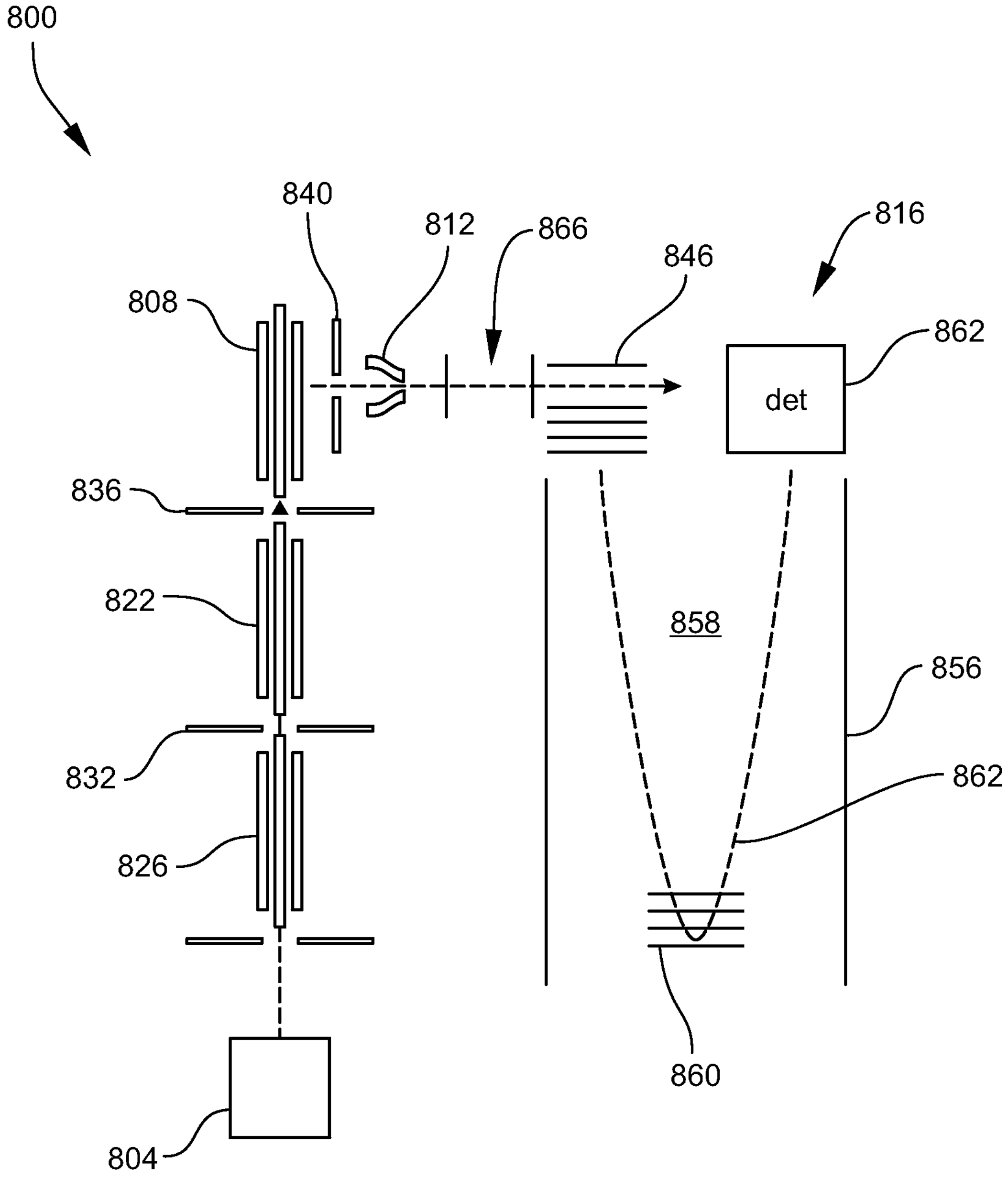
FIG. 8 is a schematic view of an example of an MS system according to another embodiment.

FIG. 8 is a schematic view of an example of a mass spectrometry (MS) system 800 according to another embodiment. The MS system 800 generally includes an ion source 804, an ion scanning trap 808, a collision cell 812, a mass spectrometer 816, and a system controller (not shown). The foregoing devices which may be the same or similar to the corresponding devices described above in conjunction with FIG. 1. In this embodiment, the collision cell 812 is configured for establishing a converging ion confining region, and thus may be configured as described above and illustrated in FIGS. 2-7. Also in this embodiment, the mass spectrometer 816 is a time-of-flight (TOF) mass spectrometer. The MS system 800 may additionally include an ion storage trap 822 as described further below. The MS system 800 may also include a suitable ion guide 826 between the ion source 804 and the ion storage trap 822, such as an RF-only multipole ion guide or a system of electrostatic lenses. The MS system 800 may also include ion optics between various components as needed to control or enhance the transmission of ions through the MS system 800. For example, an automatic gain control (AGC) gate 832 may be located between the ion guide 826 and the ion storage trap 822, which is useful for maintaining the total charge (ion count) in the ion storage trap 822 at a constant level to prevent space-charge effects that may distort the trapping field. One or more ion lenses 836 may also be located between the ion storage trap 822 and the ion scanning trap 808, and one or more ion lenses 840 may be located between the ion scanning trap 808 and the collision cell 812.

In this embodiment, the mass spectrometer 816 includes a TOF analyzer 858 and an ion detector 862. The TOF analyzer 858 includes an ion pulser (or ion extraction region) 846 and a flight tube 856. The ion pulser 846 includes a set of electrodes (e.g., grids or apertured plates) communicating with voltage sources for applying a pulsed electric field sufficient to extract ions from the ion pulser 846 into the flight tube 856. The flight tube 856 defines an electric field-free drift region through which ions drift toward the ion detector 862. The ion detector 862 may be any detector suitable for use in the TOF mass spectrometer 816, a few non-limiting examples being an electron multiplier with a flat dynode and a microchannel plate detector. The ion detector 862 detects the arrival of ions (or counts the ions) and produces representative ion detection signals. In the present example, the TOF mass spectrometer 816 is arranged as an orthogonal TOF MS—that is, the direction in which ions are extracted and drift through the flight tube 856 is generally orthogonal (or at least at an appreciable angle) to the direction in which ions are transmitted into the ion pulser 846. In other examples, the TOF mass spectrometer 816 may be on-axis with the path of ions ejected from the collision cell 812. Also in the present example, the TOF mass spectrometer 816 includes a single- or multi-stage ion reflector (or reflectron) 860 that turns the path of the ions generally 180 degrees to focus their kinetic energy before their arrival at the detector 862, as appreciated by persons skilled in the art. The resulting ion flight path in this example is generally indicated at 862. In other embodiments, the reflector 860 is not utilized and the ion pulser 846 and detector 862 may be located at opposite ends of the flight tube 856.

The MS system 800 may also include ion optics 866 between the collision cell 812 and the mass spectrometer 816. The ion optics 866 may be configured as an ion slicer that ensures that the geometry of the ion beam from the collision cell 812 matches the acceptance area of ion pulser 846 and that the transverse energy distribution is a desired (low) value. However, in some embodiments the low emittance provided by the collision cell 812 as described herein is effective enough that the ion slicer is not needed.

The ion storage trap 822 generally may have any configuration suitable for collecting ions from the ion source 804, storing the ions for a desired period of time (e.g., the duration of the ion scanning trap cycle), and transferring ions of a selected mass range out to the ion scanning trap 808. Hence, the ion storage trap 822 may have a 2D or 3D configuration similar to any of those described above in relation to the ion scanning trap 808, including RF and DC voltage sources, and may be enclosed in a vacuum chamber (not shown). Ion ejection from the ion storage trap 822 may be axial or radial.

Another example of a method for acquiring a mass spectrum from a sample of interest will now be described with reference to FIG. 8. Parent ions are transmitted from the ion source 804, through the ion guide 826, and into the ion storage trap 822. The ion count in the ion storage trap 822 may be controlled by the AGC gate 832 as noted above to avoid accumulating an excessive number of parent ions. The parent ions may be transmitted into the ion storage trap 822 essentially any time other than when the ion storage trap 822 is in the process of transmitting ions into the ion scanning trap 808. The ion storage trap 822 may hold the parent ions until the ion scanning trap 808 is ready to receive them. The ion storage trap 822 then transmits the parent ions into the ion scanning trap 808, which may be done essentially any time other than when the ion scanning trap 808 is in the process of transmitting ions into the collision cell 812. The inclusion of the ion storage trap 822 enables ion transfer efficiency to approach 100%. In some embodiments, however, the ion storage trap 822 may be eliminated and the AGC gate 832 utilized to control loading directly into the ion scanning trap 808. In this latter case, an upper limit on ion transfer efficiency is set by the loading/duty cycle of the ion scanning trap 808, but the efficiency may still be greater than 90%.

After accumulation, the ion scanning trap 808 transfers first parent ions into the collision cell 812 where at least some of the first parent ions dissociate into fragment ions as described above. The parent ions exiting the ion scanning trap 808 may have a wide range of energies, for example ranging from less than 1 eV to several keV. The energy range may scale linearly with m/z ratio. For example, ions of m/z=100 may have energies ranging from about 0 eV to about 150 eV, and ions of m/z=1000 may have energies ranging from about 0 eV to about 150 eV. The parent ions may be permitted to enter the collision cell 812 with the full range of exit energies. Alternatively, the ion lens(es) 840 may be configured to adjust the energy range to higher or lower scales as desired, such as by adjusting the DC voltage(s) applied to the ion lens(es) 840 and the collision cell 812. In either case, the ion funnel configuration of the collision cell 812 enables high collection efficiency for both parent and fragment ions that have a wide energy spread.

After dissociation, fragment ions and non-fragmented first parent ions are then transferred into the ion pulser 846 of the TOF analyzer 858, and the ion pulser 846 injects ion packets into the flight tube 856 at a controlled pulse rate. In some embodiments, the collision cell 812 is likewise configured to eject the ions in pulses. The timing of the ejection pulses from the collision cell 812 may be matched with the timing of the injection pulses into the flight tube 856 from the ion pulser 846 so as to minimize duty cycle losses in the ion pulser 846 and retain or improve the resolution of the resulting mass spectrum.

As noted previously in the present disclosure, the above-described process may be repeated for all other parent ions held in the ion scanning trap 808 to obtain a mass spectrum from all combinations of parent ions (or any desired subset of parent ion m/z ratios) and from all fragment ions derived from each parent ion m/z ratio. As an example, the ion scanning trap 808 may be capable of scanning a full mass range of 2000 Da in about 0.04 s to about 2 s, with corresponding trap scan rates ranging from about 50,000 Dais down to about 1000 Da/s. Collision cell mixing times may range, for example, from about 10 μs to about 1000 μs. The number of TOF transients per Da of trap scan time may range from 1 to 5, and TOF pulse periods may range from about 20 μs to about 200 μs. The faster scan rates, shorter scan times, shorter TOF pulse periods, and smaller collision cell mixing times all contribute to improving the spectral dynamic range of the MS system 800. The improved values for these parameters are enabled at least in part by the use of the ion scanning trap 808 as the ion selection device in front of the collision cell 812 and by the use of an ion funnel design for the collision cell 812. In practice, the dynamic range may be increased by as much as a factor of 40 or more in comparison to conventional systems.

As described above, the ion loading time into the ion storage trap 822 may be controlled to enable a desired number of parent ions (e.g., $10^4$ ions) to be accumulated in the ion storage trap 822, after which all of the parent ions may be transferred into the ion scanning trap 808 without exceeding its trap capacity (as may be dictated by space-charge effects). The ion storage trap 822 may also be utilized to pre-select a desired subset of the full mass range originated in the ion source 804, and transfer the ions in this selected mass range to the ion scanning trap 808. This may be desirable for loading a larger number of ions in the selected mass range into the ion scanning trap 808 without exceeding its trap capacity.

In another embodiment, an additional ion funnel device (not shown) may be positioned between the ion scanning trap 808 and the collision cell 812. The additional ion funnel device may be utilized to collect the parent ions of a selected mass from the ion scanning trap 808 and cool them down into a smaller energy distribution, and then transfer them into the ion funnel of the collision cell 812 for fragmentation.

Figure 9:
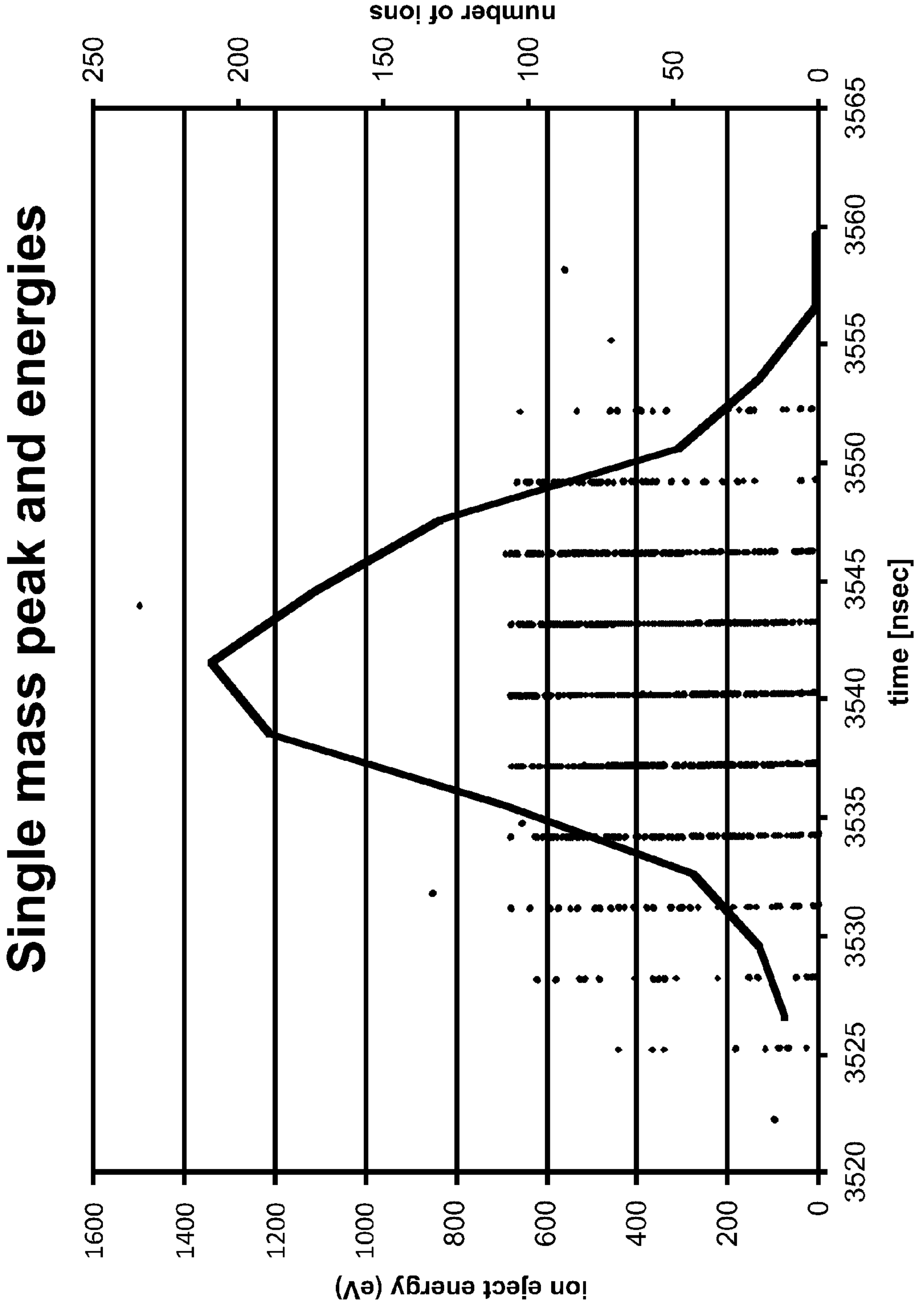
FIG. 9 illustrates the envelope of ion ejection count (number of ions) as a function of ion ejection time (ns) for a single mass (the peak curve), and the ejection energy (eV) of each individual ion as a function of the ion's ejection time (the series of dots).
Figure 10:
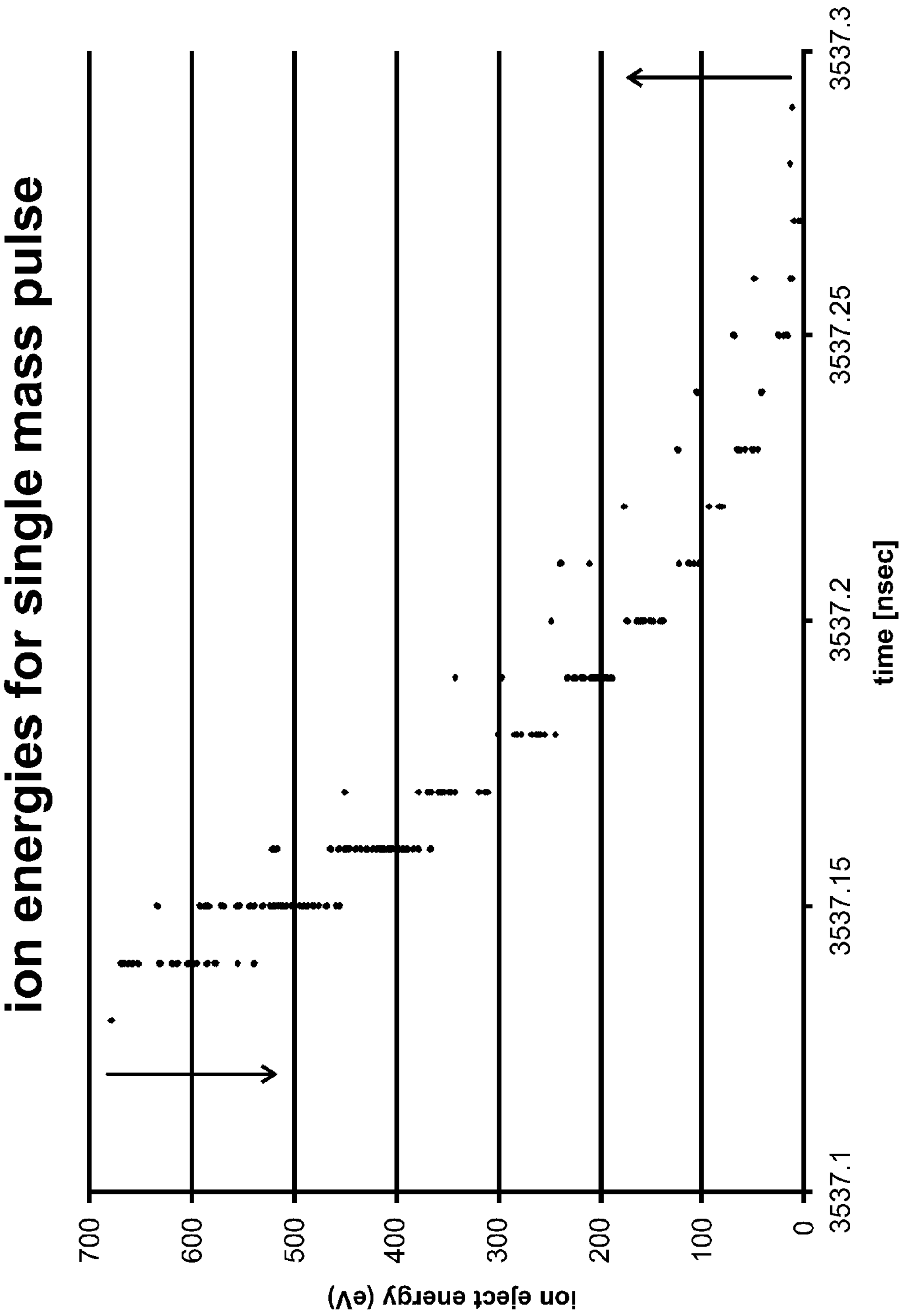
FIG. 10 is a zoomed-in view of one of the pulses illustrated in FIG. 9.

As noted above, it may be desirable to provide a device (or means) for adjusting the energy distribution (or energy range) of ions ejected from the ion scanning trap 808. For the case of transverse ejection from a linear ion trap or ejection from a 3D ion trap, the ejected ions appear in pulses at a frequency equal to the secular frequency of those ions in the trap just prior to ejection. It has been found that within each pulse, the ion energy may vary over a wide range but depends on the precise time (or phase) of ejection within the RF cycle. As an example, FIG. 9 illustrates the envelope of ion ejection count (number of ions) as a function of ion ejection time (ns) for a single mass (the peak curve), and the ejection energy (eV) of each individual ion as a function of the ion's ejection time (the series of dots). FIG. 10 is a zoomed-in view of one of these pulses, and shows that the average ion energy within each pulse follows a time-dependent function. In some implementations, it is desirable to compress or narrow the energy distribution of the ions before they undergo fragmentation in a collision cell, as schematically depicted by arrows in FIG. 10. The narrower energy distribution may provide one or more advantages, such as increasing ion collection efficiency or facilitating better control over preferred fragmentation pathways in the collision cell.

Figure 11:
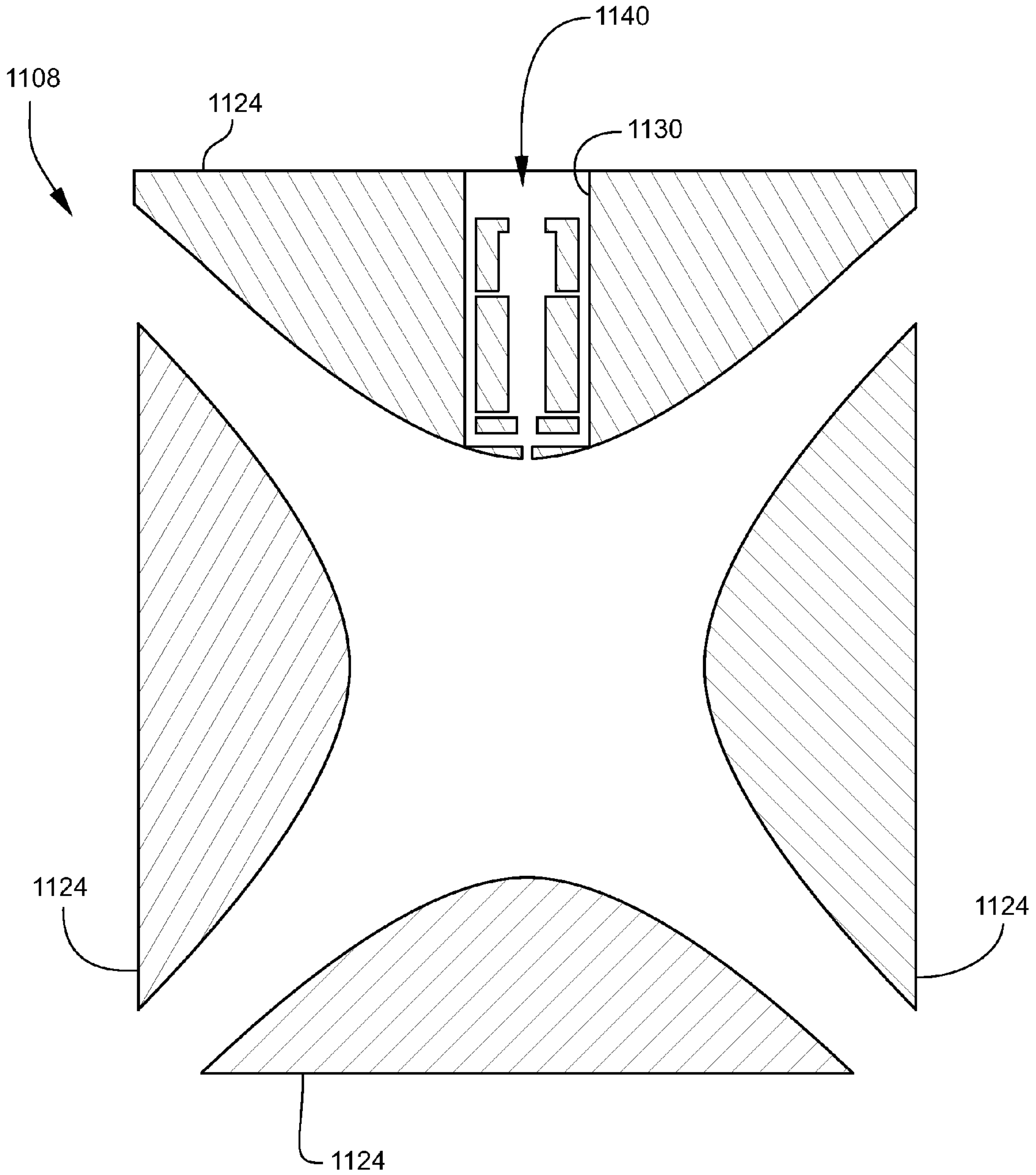
FIG. 11 is a cross-sectional view of an example of a linear ion trap that may be deployed as an ion scanning trap according to the present disclosure.
Figure 12:
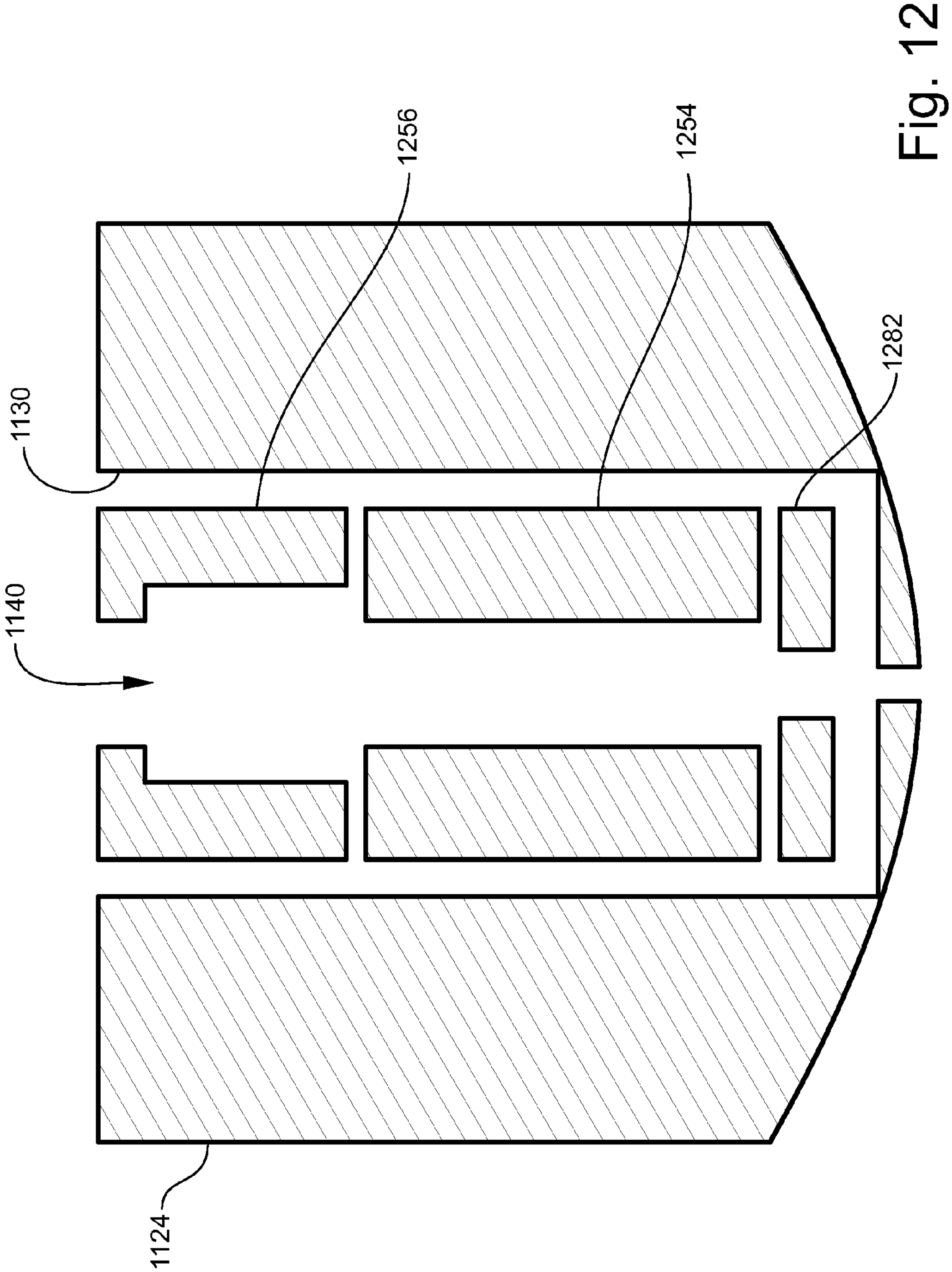
FIG. 12 is a cross-sectional view of a portion of a trap electrode of the linear ion trap illustrated in FIG. 11, at which a device for adjusting ion energy is located.
Figure 13:
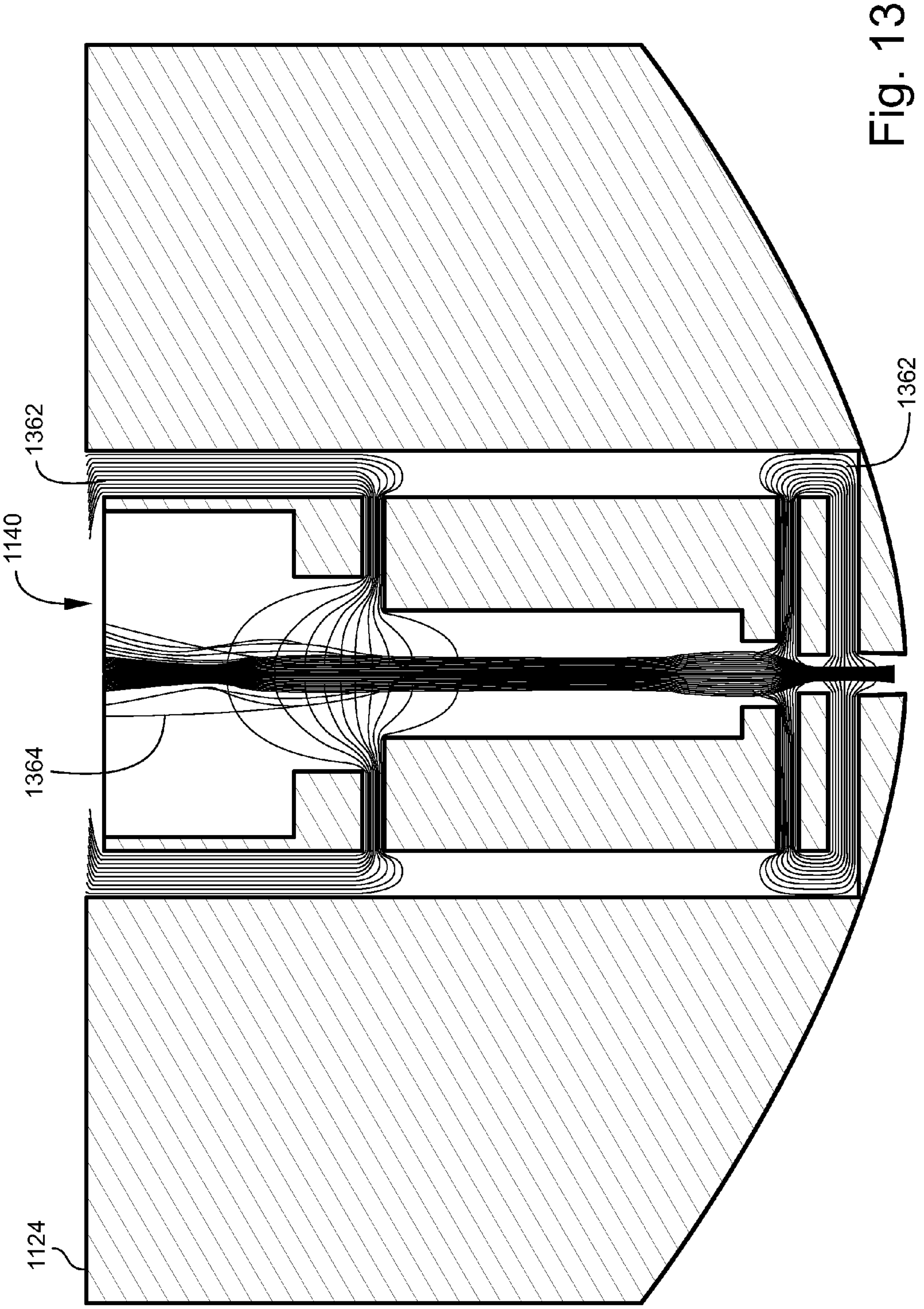
FIG. 13, is a cross-sectional view similar to FIG. 12 with equipotential lines and ion trajectories added.

In accordance with the present disclosure, a device (or means) for adjusting the ion energy distribution is provided. In some embodiments, the device may include a combination of ion optics elements (e.g., lenses, electrodes, or the like) that are positioned at (i.e., at or proximate to) the trap exit of the ion scanning trap, or at some distance between the trap exit and the collision cell. In some embodiments, such a device is schematically represented by the ion lens(es) 840 illustrated in FIG. 8. Another embodiment is illustrated in FIGS. 11-13. FIG. 11 is a cross-sectional view of an example of a linear ion trap 1108 (in the transverse plane, relative to the elongated dimension) that may be deployed as an ion scanning trap in the manner described earlier in this disclosure. The linear ion trap 1108 includes a quadrupolar arrangement of trap electrodes 1124, which in the illustrated example have hyperbolic profiles. The linear ion trap 1108 is configured for transverse (or radial) ejection, and accordingly one of the trap electrodes 1124 includes an elongated aperture serving as a trap exit 1130. In this embodiment, a device 1140 for adjusting ion energy distribution is integrated with the linear ion trap 1108. The device 1140 may include one or more lenses, one or more of which may be positioned in the trap exit 1130. FIG. 12 is a cross-sectional view of a portion of the trap electrode 1124 at which the device 1140 is located. In this example, the device 1140 includes a first exit lens 1252, a second exit lens 1254 and a third exit lens 1256.

One or more RF potentials and DC offsets may be applied to one or more of the lenses 1252, 1254 and 1256 as needed to adjust ion energy and focus the ion beam. For example, RF potentials, phases and offsets may be applied to the first exit lens 1252 and second exit lens 1254, and adjusted to selected values to both focus ions exiting the linear ion trap 1108 and re-adjust their energies to pass through the third lens 1256 (to which a DC voltage may be applied) at close to the same energy. This is illustrated by example in FIG. 13, which includes some equipotential lines 1362 and ion trajectories 1364 generated by ion simulation software.

In other embodiments, a device for adjusting ion energy distribution such as the device 1140 may be adapted for use with a 3D ion trap.

For any of the devices described herein that utilize axially elongated electrodes (or rods), one or more of such electrodes may have a composite structure that includes a central electrically conductive core (or conductive layer surrounding a central core of another material), an electrically insulating layer coaxially surrounding the conductive core or layer, and an outer electrically resistive layer coaxially surrounding the insulating layer. Electrical interconnections may be made from voltage sources to both the conductive core or layer and the resistive layer. Such electrode configurations are described in further detail in U.S. Pat. No. 7,064,322, the entire contents of which are incorporated herein by reference.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the system controller 120 schematically depicted in FIG. 1. The software memory may include an ordered listing of executable instructions for implementing logical functions (that is "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), or application specific integrated circuits (ASICs). Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the system controller 120 in FIG. 1), direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for acquiring a mass spectrum, the method comprising:

(a) accumulating a plurality of parent ions having a range of m/z ratios in an ion scanning trap;

(b) ejecting parent ions of a selected first m/z ratio from the ion scanning trap into a collision cell, wherein other parent ions of different m/z ratios remain stored in the ion scanning trap during ejection of the selected parent ions;

(c) producing fragment ions from at least some of the selected parent ions in the collision cell;

(d) confining the selected parent ions and the fragment ions to an ion confinement region that converges from an ion acceptance aperture to an ion emission aperture of the collision cell, wherein the ion emission aperture is smaller than the ion acceptance aperture;

(e) transmitting the fragment ions from the cell exit into a mass analyzer to acquire spectral data; and (h) repeating steps (b)-(e) one or more times for other parent ions accumulated in the ion scanning trap having one or more selected m/z ratios different from the first m/z ratio, wherein a plurality of fragment ion spectra are acquired from a corresponding plurality of parent ions of different respective m/z ratios.

2. The method of claim 1, comprising adjusting a collision energy of the parent ions in the collision cell by adjusting a DC potential applied between a cell entrance and a cell exit of the collision cell, or by adjusting a DC potential applied between the collision cell and an ion optics component preceding the collision cell.

3. The method of claim 1, comprising collecting the parent ions in an ion storage trap, storing the collected parent ions in the ion storage trap, and transmitting at least some of the stored parent ions from the ion storage trap to the ion scanning trap for accumulation.

4. The method of claim 3, comprising, after ejecting the selected parent ions from the ion scanning trap, transmitting at least some of the parent ions remaining in the ion storage trap into the ion scanning trap for accumulation.

5. The method of claim 1, comprising loading a desired number of parent ions into an ion storage trap and transmitting the parent ions into the ion scanning trap for accumulation, wherein the desired number is one that minimizes space-charge effects in the ion scanning trap.

6. The method of claim 1, comprising producing a plurality of parent ions having an initial range of m/z ratios in an ion source and transmitting the parent ions into an ion storage trap, storing the parent ions in the ion storage trap, and transmitting parent ions of a selected range of m/z ratios from the ion storage trap into the ion scanning trap, wherein the plurality of parent ions accumulated in the ion scanning trap has a range of m/z ratios that is a subset of the initial range of m/z ratios transmitted into the ion storage trap.

7. The method of claim 6, comprising, after ejecting the parent ions of the subset from the ion scanning trap, transmitting parent ions of a different range of m/z ratios from the ion storage trap into the ion scanning trap, wherein the different range is a different subset of the initial range of m/z ratios transmitted into the ion storage trap.

8. The method of claim 1, wherein transmitting the fragment ions into the mass analyzer comprises transmitting the fragment ions into a pulser of a time-of-flight analyzer.

9. The method of claim 8, wherein transmitting the fragment ions into the pulser comprises performing pulsed ejection of sequential packets of the fragment ions from the collision cell, and the timing of the pulsed ejection is matched with the timing of pulsed extraction of packets of the fragment ions from the pulser into a flight tube of the time-of-flight analyzer.

10. A mass spectrometry system, comprising a sequential arrangement of an ion scanning trap, a collision cell and a mass analyzer, and configured to perform the method of claim 1.

11. A mass spectrometry system, comprising:

an ion scanning trap comprising a plurality of trap electrodes surrounding an ion trapping region and configured for generating a radio frequency (RF) ion trapping field in the ion trapping region, and a trap exit communicating with the ion trapping region;

a device configured for applying an RF trapping voltage to the trap electrodes;

a device configured for scanning ions from the ion trapping region and through the trap exit on a mass-selective basis;

a collision cell comprising a cell entrance communicating with the trap exit, a cell exit, and a plurality of cell electrodes arranged around a cell axis and between the cell entrance and the cell exit, wherein the cell electrodes surround an ion confining region and are configured for generating an RF ion confining field in the ion confining region such that the ion confining region converges in cross-section in a direction from the cell entrance to the cell exit;

a device for applying an RF confining voltage to the cell electrodes; and a mass analyzer communicating with the cell exit.

12. The mass spectrometry system of claim 11, wherein the cell electrodes are elongated in the direction from the cell entrance to the cell exit and oriented at an angle relative to the cell axis such that one or more opposing pairs of the cell electrodes converge toward the cell exit.

13. The mass spectrometry system of claim 11, wherein the cell electrodes are elongated in an axial direction from the cell entrance to the cell exit and have respective diameters that vary along the axial direction such that a cross-sectional area of the ion trapping region is greater at the cell entrance than at the cell exit.

14. The mass spectrometry system of claim 11, wherein the cell electrodes are plate-shaped and axially spaced along the cell axis, and the cell electrodes have respective apertures, and wherein the apertures have respective cross-sectional areas that are successively reduced in the direction from the cell entrance to the cell exit.

15. The mass spectrometry system of claim 11, wherein the plurality of cell electrodes comprises a plurality of first cell electrodes disposed on a first substrate and a plurality of second cell electrodes disposed on a second substrate in radial opposition to the first cell electrodes relative to the cell axis, the first cell electrodes are elongated along the first substrate in the direction from the cell entrance to the cell exit, the second electrodes are elongated along the second substrate in the direction from the cell entrance to the cell exit, and the first cell electrodes and the second cell electrodes are oriented at an angle relative to the cell axis such that the first cell electrodes and the second cell electrodes converge toward the cell exit.

16. The mass spectrometry system of claim 11, wherein the plurality of cell electrodes comprises a plurality of first cell electrodes disposed on a first substrate and a plurality of second cell electrodes disposed on a second substrate in radial opposition to the first cell electrodes relative to the cell axis, the first cell electrodes are spaced from each other along the first substrate in the direction from the cell entrance to the cell exit, the second electrodes are spaced from each other along the second substrate in the direction from the cell entrance to the cell exit, and the first cell substrate and the second substrate are oriented at an angle relative to the cell axis such that a transverse spacing between the first cell electrodes and the second cell electrodes in the radial direction is reduced in the direction from the cell entrance to the cell exit.

17. The mass spectrometry system of claim 11, comprising a device for ejecting ions from the cell exit in pulses wherein discrete ion packets enter the mass analyzer.

18. The mass spectrometry system of claim 17, wherein the device for ejecting ions from the cell exit is configured for applying a potential barrier at the cell exit and adjusting the potential barrier to alternately permit and prevent transmission of ions through the cell exit.

19. The mass spectrometry system of claim 17, wherein the mass analyzer is a time-of-flight (TOF) analyzer comprising a pulser, and further comprising a device for matching the timing of the device for ejecting ions from the cell exit with the timing of the pulser to minimize loss of ions in the pulser.

20. The mass spectrometry system of claim 11, comprising an ion storage trap configured for selectively storing ions and transmitting ions into the ion scanning trap.

* * * * *